Dec. 20, 1955 C. E. JOHNSON ET AL 2,727,920
OXIDATION OF MERCAPTANS TO SULFONIC ACIDS
Filed April 20, 1951
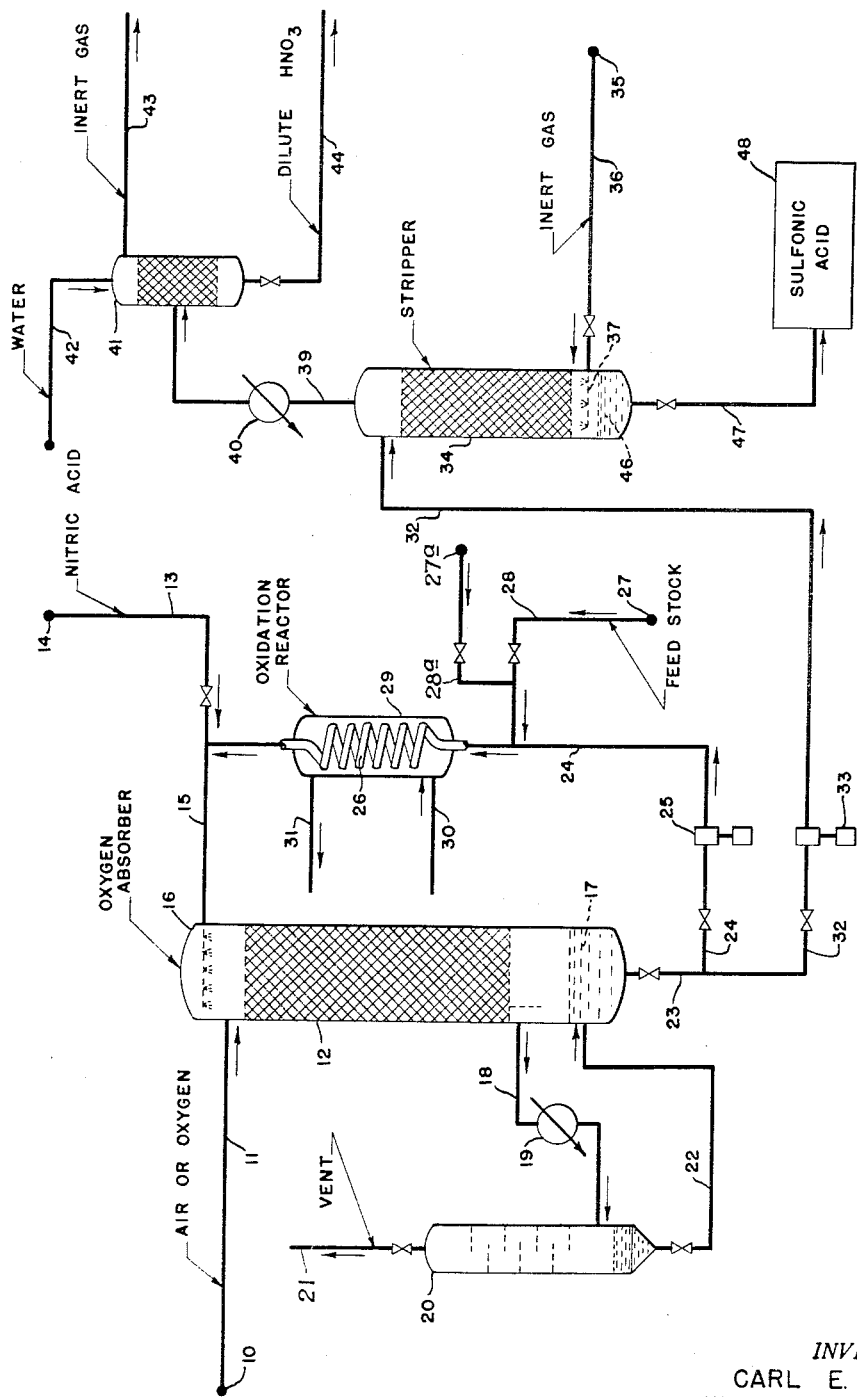
INVENTORS:
CARL E. JOHNSON
WILLIAM F. WOLFF
BY: *Olin E. Williams*
ATTORNEY:

United States Patent Office 2,727,920
Patented Dec. 20, 1955

2,727,920

OXIDATION OF MERCAPTANS TO SULFONIC ACIDS

Carl E. Johnson, Griffith, and William F. Wolff, Hammond, Ind., assignors to Standard Oil Company, Chicago, Ill., a corporation of Indiana Application April 20, 1951, Serial No. 221,984

19 Claims. (Cl. 260—513)

This invention relates to an improved process for preparing organic sulfonic acids. It has particular reference to improvements in a process of catalytic oxidation of organic sulfur compounds having the general formula RSH wherein R can be an alkyl, aralkyl, or cycloalkyl radical.

A known process for the preparation of organic sulfonic acids by the oxidation of mercaptans is disclosed and claimed in a U. S. patent to Proell et al., 2,505.910 issued May 2, 1950. In this process a gas containing free oxygen is flowed into contact with a non-tertiary mercaptan in the presence of a catalyst selected from the group consisting of $NO_2$, $N_2O_3$, $N_2O_4$, $N_2O_5$, which may be generated in the reaction zone by nitric acid. In the patented process air is charged to a reactor containing the mercaptan for a considerable period, in one example 45 minutes, before oxygen absorption occurs and before any reaction product is obtained. During this period the mercaptan turns a bright red, presumably due to the formation of a mercaptan-nitrogen oxide complex. When oxidation of the mercaptan in this complex eventually occurs, it occurs with almost explosive violence. The sulfonic acid products of the patented process range in color from dark brown to pale yellow and must be further treated by a separate oxidizing step employing, for example, nitric acid, to remove the color and odor bodies remaining in this product.

It is a primary object of the present invention to provide an improved process for the production of sulfonic acids in a direct single-step oxidation whereby substantially colorless sulfonic acids substantially free of partially-oxidized contaminants are produced.

It is another object of this invention to provide a process for the production of sulfonic acids by the oxidation of mercaptans while avoiding the violence of the reaction above-described and obviating the difficulty of containing the reacting mass in conventional apparatus.

It is yet another object of the present invention to provide a process for the direct oxidation of mercaptans to organic sulfonic acids without the necessity of oxidizing mercaptan feed stocks by an intermediate step to organic disulfides. Organic disulfides can be oxidized by a gas containing free oxygen in the presence of a catalyst selected from the group $NO_2$, $N_2O_3$, $N_2O_4$ and $N_2O_5$ as taught in Proell et al., 2,433,395. The product of this process uniformly resulted in the production of "a pale, reddish-brown colored product" which had to be bleached with concentrated nitric acid in a separate step in order to remove color and odor bodies. Our co-pending application Ser. No. 205,902 filed January 13, 1951, now Patent No. 2,697,722, has for its object the production of an improved organic sulfonic acid product in a single step by direct oxidation of disulfides. Usually, however, these organic disulfides are obtained indirectly from mercaptans. This is especially true in the petroleum refining art wherein petroleum distillates are desulfurized by extraction of distillates with caustic-solutizer solutions as described by D. A. Yabroff et al. (Ind. Eng. Chem. 32, 950–953 (1940)) and disulfides are produced by catalytic oxidation of the mercaptides in the caustic-solutizer solutions as described by J. P. O'Donnell (The Oil and Gas Journal, pp. 45–47 (July 1, 1944). As stated above, an object of this invention is the avoidance of such intermediate steps for the production of disulfides and the provision, instead, of a direct process of oxidizing mercaptans to organic sulfonic acids while at the same time avoiding the described difficulties encountered by known processes.

Yet another object of the invention is the provision of a process for producing organic sulfonic acids in high yield and highly purified condition wherein air or oxygen alone is consumed in the oxidation of mercaptans to the said acids, and wherein catalyst and/or reaction medium are recyclable and are not consumed by the oxidation reaction. The invention has for other objects such other advantages or results as will be found to obtain in the specification and claims hereinafter made.

Briefly, this invention comprises the introduction of relatively small quantities of feed stock consisting of a saturated hydrocarbon thiol into relatively large quantities of a liquid reaction medium containing nitrogen oxide catalyst and absorbed oxygen and effecting an oxidation of the said thiol to a sulfonic acid in the presence of the said catalyst and also a promoter compound. Hydrocarbon thiols in which the sulfhydryl group is linked to a non-tertiary hydrocarbon is much preferred as feed stock, these thiols providing high, almost theoretical, yields of the corresponding sulfonic acids. In order to avoid prolonged induction periods or explosive or uneven reaction rates, it is essential to form in situ or to add to the said medium, either just before introduction of the feed stock or simultaneously therewith or just after introduction of feed stock, a minute quantity of a promoter that will initiate the reaction and will continue to promote the oxidation of each increment of introduced thiol.

The said promoter is an intermediate oxidation product of a mercaptan; the term "intermediate oxidation product" does not include the ultimate products, either the sulfur oxides or the carbon oxides, but does include substances, such as sulfur, that will produce an intermediate oxidation product of a mercaptan under initial reaction conditions. The promoter can be an organic polysulfide, sulfoxide, disulfoxide, disulfone or sulfonic acid. The organic polysulfide is a compound having the formula $RS_nR'$ wherein R and R' are hydrocarbon radicals and $n$ is an integer between one and six inclusive and in which R and R' are preferably the same and more preferably are the same as the hydrocarbon radical of the feed stock and in which $n$ is preferably 2. The other oxidation products have the formulas, $RSOSR'$, $RSOOSR'$, $RSO_4R'$, and $RHSO_3$, in which R and R' are hydrocarbon radicals.

Minute amounts of this promoter will immediately initiate reaction of added hydrocarbon thiol that has been introduced into a liquid medium containing a nitrogen oxide catalyst and oxygen or oxygen-containing gas. These minute amounts can be supplied by introducing a very small quantity of mercaptan into a nitric acid solution of oxygen and subjecting the mercaptan to a prolonged induction period. The mercaptan will then react with explosive violence but this very small amount will exert no disturbing effect and will nevertheless supply enough of some oxidation product to promote the oxidation reaction.

Once the reaction is initiated by the introduction of some promoter, reaction will thereafter continues smoothly, apparently because the promoter, being an oxidation product of the mercaptan, is always present once the oxidation has begun. Thus one can explain this continued promotion of oxidation, without, however, limiting the invention to any solely theoretical considerations, on the basis that, for example, the disulfide promoter is self-regenerable since it initiates a reaction that continues to produce promoter disulfides as an intermediate product even though the initially introduced promoter disulfide may itself be oxidized. In the absence of the promoter, added hydrocarbon thiol will react with the nitrogen oxide catalyst and will form a complex with all the catalyst, this complex being an explosive, red compound that will oxidize to sulfonic acid only after a prolonged induction period. The hydrocarbon thiol-nitrogen oxide complex as indicated by a red coloration appears to be momentarily formed even when promoter compound is present; but this observed red color of the complex rapidly disappears.

In carrying out our invention we slowly add a saturated hydrocarbon thiol in which, preferably, the sulfhydryl group is linked to a non-tertiary carbon atom, the said thiol being a mercaptan having the formula RSH in which R can be an alkyl, cycloalkyl, or aralkyl radical, to an aqueous solution of nitric acid containing by weight from 10 to about 70 per cent and preferably from 35 to about 50 percent of nitric acid under pressure of oxygen containing gas at a pressure between about 1 and 20 atmospheres, the introduced hydrocarbon thiol compound or the aqueous reaction medium containing initially a very minor quantity of a selected mercaptan-oxidation-product promoter. The oxidizing reaction mixture is cooled, preferably by an extraneous cooling medium, to a reaction temperature between about 10° and 130° C. and preferably between 20° and 60° C. While the ratio of nitric acid to introduced and hence substantially instantaneously oxidized mercaptan is of no critical importance it is preferable to maintain a ratio of about 0.1 to 10 mols of nitric acid per mol of the oxidized mercaptan and more preferably from 0.1 to 0.8 mol of nitric acid per mol of the oxidized mercaptan or sulfonic acid in the circulating system. Of course the instantaneous ratio of nitric acid to introduced mercaptan will be very high. On the other hand, since introduced air or oxygen is the only consumed reactant the ultimate ratio of introduced mercaptan to nitric acid is beyond practical measurement.

If the process is performed batchwise, upon completion of the introduction of mercaptan the reaction mixture is then stripped with an inert gas. If the process is performed in continuous manner nitric acid containing organic sulfonic acid can be removed from the oxidation system preferably at a rate approximating the rate of introduction of mercaptan into the system, and be stripped with an inert gas preferably at temperatures between about 80° and 150° C. Water and nitric acid will thus be stripped from the sulfonic acid which can be obtained by this process in yields as high as 98 to 99 percent of theoretical and which will be found to be of improved color and purity. The acids are quite low in sulfate content and in reducing-impurities as indicated by their permanganate number, having less than one-fourth the impurities displayed by sulfonic acids produced by the known processes.

Feed stocks that are especially suitable for charging to this process are those saturated non-tertiary hydrocarbon thiols having an alkyl group such, for example, as methyl, isopropyl, secondary butyl, amyl, lauryl, hexadecyl, octodecyl and the like. Suitable cycloalkyl groups include cyclopentyl, methylcyclopentyl, cyclohexyl and the like. A suitable aralkyl radical is the benzyl group.

When the present process was operated with a tertiary mercaptan, tertiary butyl mercaptan, reaction proceeded to give, in addition to about a 30% yield of a water-soluble, apparently sulfonic-acid product, an uncharacterized, highly lacrimatory heterogeneous product, insoluble in water. Oxygen consumption during thhe reaction was low and would account for only partial oxidation of the converted mercaptan to sulfonic acid.

An industrial source of considerable volume of feed stock for our process can be obtained from the various petroleum fractions derived from sulfur-bearing crude oils. A petroleum fraction in, for example, the gasoline range, can be extracted with a caustic solution which will remove mercaptans from the said fraction. The caustic solution can be stripped with open steam and the mercaptans collected as a distillate fraction. These mercaptan feed stocks can be fractionated so that only a single mercaptan is oxidized, or a mixture of mercaptans can be employed.

Mercaptans suitable for feed stock can be prepared synthetically, for example, by the addition of hydrogen sulfide to olefins.

The oxidation products may be recovered from the reaction mixture by various methods which will vary with the nature of the individual product mixture. Such methods as extraction with solvents, fractional crystallization, distillation and the like may be used.

In the accompanying drawing the single figure is a schematic flow diagram illustrating a preferred arrangement of apparatus suitable for carrying out the process of invention.

Referring now to the drawing, a continuous process set up to produce about four tons a day of mixed alkanesulfonic acid is described. Air is passed at a rate of about 14,500 standard cubic feet per hour from a source 10 through a line 11 in which can be disposed a drier (not shown) and is forced into an oxygen absorber 12 which consists of a packed tower about twenty feet high. The packing can be for example, hurdles or Raschig rings. The tower is maintained at a pressure of about fifty pounds per square inch gage. Nitric acid is flowed at a rate of about 98 pounds per hour (on an anhydrous basis) under pressure into valved line 13 from a source 14 and through a recycle line 15, wherein it admixes with recycled material, and into the absorber 12. The nitric acid and recycled liquid is sprayed from a distributor 16 disposed above the packing in the extreme upper portion of tower 12. Nitric acid, recycle liquid, and the introduced air flow concurrently down over the packing. The admixed gas and liquid is maintained at a temperature between 15° to 60° C.

The mixed liquids containing recycle material and nitric acid collect in the separating zone 17 at the bottom of the column 12. The solution will contain oxygen absorbed during passage through the packed tower. In addition to providing for absorption of oxygen the foregoing treatment will also effect an oxidation of any reduced nitrogen oxides, e. g. nitric oxide, formed during the oxidation of sulfides. Gas which has separated from the liquids in the separator zone 17 will flow from the tower 12 through a line 18 in which is disposed cooler 19 into a separator 20 containing baffles or other conventional separating means and will be vented from the separator 20 through valved line 21. Liquid separated in the separator 20 will be returned to the valved line 22 to the bath of liquid in separator 17.

The solution of nitric acid containing absorbed oxygen and recycle liquids is withdrawn from the tower 12 at a rate of approximately 200,000 pounds per hour through a valved line 23 and is pumped therefrom through valved line 24 by a pump 25 disposed therein to oxidation reactor 26.

Feed stock in the present preferred embodiment is a mixed mercaptan consisting of primary and secondary alkyl mercaptans having from one to about 6 carbon atoms per molecule and obtained as previously described herein by steam distillation of a caustic solution of mercaptides derived from caustic extraction of a petroleum naphtha. The mixture is substantially free of naphtha and phenolic materials. The average molecular weight is about 62 corresponding to ethyl mercaptan. The feed stock is flowed under pressure at a rate of 196 pounds per hour from a source 27 through valved line 28 into the line 24 and thence into the said oxidation reactor 26. The reactor 26 is a coil which can be about 5 to 10 feet in length and is surrounded by cooling water in a jacket 29 having a conventional water inlet 30 and outlet 31.

About 100 cubic centimeters of diethyl disulfide are delivered from a source 27a through valved line 28a into line 28 just upstream of its junction with line 24 and is fed with the initial portion of the aforesaid feed stock into the said oxidation reactor 26 and the solution of oxygen in aqueous nitric acid contained therein.

Oxidation of the feed stock mercaptans is accomplished almost instantaneously in the reactor 26. Observation of the reaction in the laboratory indicates a slight temporary formation of the red nitrate-mercaptan complex but this disappears almost immediately. Absorption of oxygen begins the moment the disulfide promoter is added. The reaction is, of course, exothermic and therefore cooling is employed to maintain temperatures below about 100° C. and preferably between about 15° C. and 60° C.

Liquid product is flowed from the oxidation reactor and is recycled through the line 15 to the oxygen absorber 12. The reaction product will contain a yield of sulfonic acids of about 95 mol percent of the introduced feed stock. It will also contain nitric acid depleted of oxygen and to a lesser degree some water and nitrogen oxides. It is recycled to the oxygen absorber solely for the purpose of restoring the oxygen content of the acidic liquid reaction medium, an amount of oxygen having been consumed in the oxidation reactor about stoichiometrically equivalent to the weight of introduced and oxidized feed stock.

Product containing nitric acid with which it is bound in a loose complex is withdrawn from the described process from a point at the junction of valved lines 23 and 24 and is pumped at a rate of 50 gallons per hour through a valved line 32 by a pump 33 into an upper portion of stripper column 34. The product liquid which is maintained at a temperature between about 80° and 140° C. and at a mild pressure flows down over hurdles or Raschig rings of said stripper column in countercurrent contact with an inert gas which is flowed under pressure from a source 35 through valved line 36 into the stripper 34 at a point near the base thereof. The inert gas is discharged into the column from a distributor 37 disposed directly beneath the packing. The inert gas strips nitrogen oxides from the countercurrently flowing product liquid and flows out of the stripper through a line 39, through a cooler 40 disposed therein, and into a scrubber 41 wherein the inert gas and stripped nitrogen oxides are scrubbed with water introduced through line 42. Inert gas is liberated through vented line 43. Aqueous solution of nitrogen oxides, being essentially a dilute solution of nitric acid, is withdrawn through valved line 44. This dilute nitric acid can be returned to the oxidation system and be added to the nitric acid in valved line 13 or it can be concentrated prior to its return to the said system. It may contain a very minor amount of sulfonic acid carried over with the stripping gas stream and so it is preferable to reemploy the dilute acid in the process.

Sulfonic acid from which bonded nitric acid or nitrogen oxides have been removed by the said stripper 34 is withdrawn from a settling zone 46 in the bottom of column 34 through a valved line 47 at a rate of about 330 pounds per hour and is delivered to storage means 48. The sulfonic acid will be between 95 and 100 percent pure and will display a specific gravity of about 1.355 at 22° C. and a permanganate number of between about 10 and 20 as compared to 60 for the products of prior art processes. These permanganate numbers are relative only and are determined by titration with a standard permanganate solution of a diluted aliquot of the sulfonic acid to an endpoint at which the pink coloration of permanganate remains in the titrated solution. The permanganate number is defined by the folowing expression:

$$PN = \frac{\text{cc. of } KMnO_4 \times 1000}{\text{cc. of acid} \times \text{percentage concentration of acid}}$$

The following examples serve to illustrate the present invention with respect to the oxidation of two mercaptans that are available in commercial quantities in refineries.

*Example I*

Nitric acid was circulated by a stainless steel circulating pump through a glass spray chamber maintained under an oxygen pressure of between 2 and about 5 pounds per square inch gauge. The nitric acid containing absorbed oxygen was flowed from the spray chamber through a mixing and reaction zone and then was returned to the said chamber. The system contained a total of 1.4 gram mols of nitric acid. Isopropyl mercaptan was slowly added to the aqueous nitric acid solution, which had a concentration of about 41 percent, until about 5 millimeters of the mercaptan had been added. No reaction was obtained and no absorption of oxygen was observed. A few drops of methyl disulfide were then added to the system. After 24 minutes, oxidation of mercaptan and consumption of oxygen began. Reaction was not initiated immediately upon introduction of promoter because it was not introduced with the first portions of mercaptan and consequently an accumulation of complex was permitted which presumably must be destroyed to permit reaction to proceed. Once the oxidation had begun the mercaptan was steadily and slowly added to the nitric acid, 100 milliliters of isoproply mercaptan being added over a period of about one hour. Oxidation of the mercaptan appeared to occur almost immediately upon addition to the nitric acid. The consumption of free oxygen was substantially equivalent to the mol weight of converted ethyl mercaptan. The product was withdrawn and stripped with nitrogen to remove nitric acid and water, and a colorless, odorless propane-2-sulfonic acid was obtained in 92.5 percent of theoretical yield. The sulfonic acid contained only 0.18 percent sulfuric acid.

*Example II*

Aqueous nitric acid in about 41 percent concentration was circulated through the apparatus described in Example I. Before addition of any mercaptan 5 milliliters of ethyl disulfide were introduced into the circulating nitric acid under nitrogen pressure. Thereafter 100 milliliters of ethyl mercaptan were slowly introduced into the system. The ethyl mercaptan oxidized substantially immediately upon introduction; addition of mercaptan and oxidation thereof was completed in a period of 50 minutes. The consumption of free oxygen was substantially equivalent to the weight of converted ethyl mrecaptan. After stripping the water and nitric acid from the product an odorless and colorless ethane sulfonic acid was obtained having a specific gravity of 1.360.

*Example III*

A few drops of mixed alkane sulfonic acids having a molecular weight about equivalent to that of ethane sulfonic acid and containing both this acid and some methane- and propane-sulfonic acid, were added to a dilute solution of nitric acid having a nitric acid content of 41 percent and under pressure of an oxygen-containing gas of approximately atmospheric. Isopropyl mercaptan was thereafter slowly added to a relatively large volume of the aqueous nitric acid solution containing the sulfonic acid while maintaining a temperature of slightly above room temperature and a deep red color was rapidly formed and was rapidly dissipated with resultant oxidation of the isopropyl mercaptan and solution of the product in the aqueous nitric acid solution.

The experiment was repeated under the same conditions using the same reactants with the exception that no promoter was added to the aqueous nitric acid solution. No reaction whatsoever was observed.

*Example IV*

In this example it is shown that the mercaptan-oxidation-product promoter can be formed in situ in the reaction zone. The oxidation apparatus described in the foregoing examples contained 170 milliliters of 41 percent nitric acid and the acid was under a pressure of 5 pounds per square inch gauge of oxygen. To this aqueous nitric acid solution only 5 milliliters of isopropyl mercaptan was added. The system was maintained at a temperature of 30° C. There was no evidence of any immediate reaction of the mercaptan. After a period of 50 minutes a slight brown coloration was observed in a small oil layer and a slight pink color was observed after an additional 15 minutes. This pink color deepened and became red after an additional 50 minutes. After 125 minutes had elapsed from the initial addition of mercaptan, during which period no oxygen was absorbed, a sudden reaction occurred with evolution of red fumes, oxygen was absorbed, and the red color disappeared. After this reaction, additional mercaptan was added and oxidation proceeded smoothly.

It is noted that even this small amount of mercaptan reacted with some violence and it would be highly unfeasible to add any really substantial amount of mercaptan to the nitric acid solution because of the explosion that would ensue. Thus the example demonstrates not only the fact that the promoter can be produced in situ if a small amount of mercaptan is held in the acid solution for a long time but also it illustrates the prolonged induction period that is encountered unless a promoter is introduced initially with the mercaptan feed.

The invention therefore encompasses not only the process of oxidizing mercaptans in which oxidation is initiated by the addition of an organic mercaptan-oxidation product but also the oxidation process when the oxidation product is formed in situ; either procedure is suitable (for it will ensure the constant presence of the promoter compound during the oxidation process) so long as the order of addition is of mercaptan to relatively large volumes of oxidizing medium thus providing a colorless and odorless product substantially free of contaminating partial oxidation products.

The term "catalytic" used in the claims is defined in Webster's New International Dictionary, Second Edition (1934) Unabridged, page 421, as follows: "Catalytic, adj., Pertaining * * * to, * * * or causing, catalysis."

Having described our invention, we claim:

1. A process for the production of sulfonic acid, which process comprises introducing, in an oxidation reaction zone, a saturated hydrocarbon thiol into an aqueous solution of nitric acid containing absorbed oxygen, maintaining a substantial instantaneous excess of said solution with respect to said thiol in said zone, effecting oxidation of said thiol in the presence of a catalytic amount of an intermediate mercaptan-oxidation product, and recovering a sulfonic acid so produced.

2. A process for the production of an organic sulfonic acid, which process comprises slowly introducing a saturated hydrocarbon thiol, having the formula RSH in which R is selected from the group consisting of alkyl, aralkyl, and cycloalkyl radicals, into an aqueous solution of nitric acid containing absorbed oxygen, said solution being present in substantial excess with respect to said thiol, effecting oxidation of the said thiol in the presence of a catalytic amount of an intermediate mercaptan-oxidation-product promoter, and recovering a sulfonic acid so produced.

3. The process of claim 2 in which the said mercaptan-oxidation product is a hydrocarbon sulfoxide.

4. The process of claim 2 in which the said mercaptan-oxidation product is a hydrocarbon disulfoxide.

5. The process of claim 2 in which the said mercaptan-oxidation product is a hydrocarbon disulfone.

6. The process of claim 2 in which the said mercaptan-oxidation product is a hydrocarbon sulfonic acid.

7. The process of claim 2 in which the said mercaptan-oxidation product is a hydrocarbon polysulfide having the formula $RS_nR'$ wherein R and R' are hydrocarbon radicals and $n$ is an integer between one and six inclusive.

8. The process of claim 7 wherein $n$ is 2.

9. The process of claim 7 wherein $n$ is 2 and R and R' represent alkyl groups.

10. A process for the production of an organic sulfonic acid, the said process comprising the steps of slowly introducing into a large volume of an aqueous solution of nitric acid containing absorbed free oxygen a saturated hydrocarbon thiol wherein the sulfhydryl group is linked to a non-tertiary carbon atom while maintaining at any moment the aqueous nitric acid solution in multimolar excess with respect to introduced thiol, introducing into the reaction zone substantially contemporaneously with initial introduction of mercaptan a small amount of an intermediate mercaptan-oxidation product selected from the group consisting of hydrocarbon polysulfides, sulfoxides, disulfoxides, disulfones and sulfonic acids, cooling the oxidizing reaction mixture to maintain the temperature of the said mixture between 10° and 130° C., effecting oxidation of the said thiol, recycling the aqueous solution of nitric acid to contact a gas containing free oxygen to absorb therein free oxygen substantially equivalent to the amount of oxidized thiol and restore the oxygen content of the solution depleted by the oxidation of the thiol, recycling the aqueous nitric acid solution to the reaction zone, and recovering a sulfonic acid so produced.

11. A process for the production of an organic sulfonic acid, the said process comprising, slowly introducing a saturated hydrocarbon thiol wherein the sulfhydryl group is linked to a non-tertiary carbon atom into a relatively large body of aqueous solution of nitric acid containing absorbed free oxygen, introducing into the reaction zone substantially contemporaneously with initial introduction of the thiol a catalytic amount of an intermediate thiol-oxidation-product promoter, cooling the oxidizing reaction mixture to maintain the temperature of the said mixture between 10° and 130° C., effecting reaction between the oxygen and said thiol, and recovering a sulfonic acid so produced.

12. The process of claim 11 in which the intermediate mercaptan-oxidation product is selected from the group consisting of hydrocarbon polysulfides, sulfoxides, disulfoxides, disulfones, and sulfonic acids.

13. The process of claim 11 wherein the saturated hydrocarbon thiol is an alkane thiol.

14. A process for the production of sulfonic acid which process comprises slowly introducing an alkane thiol wherein the sulfhydryl group is linked to a non-tertiary carbon atom into a relatively large volume of an aqueous reaction medium containing absorbed free oxygen and nitric acid and effecting substantially instantaneous oxidation of the introduced thiol at a temperature between about 20° and 60° C., introducing, substantially simultaneously with the initial introduction of thiol into the aqueous medium, a catalytic amount of an effectively self-regenerable promoter compound having the formula $RS_nR'$ wherein R and R' are hydrocarbon radicals and $n$ is an integer between 1 and 6 inclusive, and recovering a sulfonic acid so produced.

15. A process for the production of an organic sulfonic acid, the said process comprising; slowly introducing into an aqueous solution of nitric acid containing from 10 to 70% by weight of acid and absorbed free oxygen an alkyl mercaptan wherein the sulfhydryl group is linked to a non-tertiary carbon atom, while maintaining at any moment the aqueous nitric acid solution in substantial excess with respect to introduced thiol; introducing into the reaction zone as a promoter substantially contemporaneously with the initial introduction of mercaptan a catalytic amount of alkyl disulfide and effecting rapid oxidation of the mercaptan by the said absorbed free oxygen; cooling the oxidizing reaction mixture to maintain the temperature of said mixture between 20° and 60° C.; effecting oxidation of the said thiol; recycling the aqueous solution of nitric acid to the contact, under a pressure of at least about one atmosphere, of a gas containing free oxygen to absorb therein free oxygen substantially equivalent to the amount of oxidized thiol and restore the oxygen content of the solution depleted by the oxidation of the thiol; recycling the aqueous nitric acid solution; and recovering a sulfonic acid so produced.

16. The process of claim 15 in which the aqueous nitric acid containing the said produced sulfonic acid is stripped with an inert gas from the said sulfonic acid.

17. The process of claim 15 in which the aqueous nitric acid containing the said produced sulfonic acid is stripped with an inert gas at a temperature between about 80° and 150° C. from the said sulfonic acid.

18. A cyclic recirculatory process for the manufacture of a sulfonic acid, which process comprises absorbing free oxygen in an absorption zone in aqueous nitric acid having a nitric acid concentration within the range of about 10 to about 70 weight percent, thereafter circulating oxygen-enriched aqueous nitric acid thus produced to a thiol oxidation zone, introducing a saturated hydrocarbon thiol wherein the sulfhydryl group is linked to a non-tertiary carbon atom into said thiol oxidation zone and into said nitric acid solution at such a rate as to maintain a substantial instantaneous excess of said nitric acid solution with respect to said thiol, effecting oxidation of said thiol while maintaining an oxidation reaction temperature between about 10° C. and about 130° C., withdrawing oxidation reaction mixture from said thiol oxidation zone; thereafter circulating oxidation reaction mixture from said thiol oxidation zone through said absorption zone, restoring the free oxygen content of said mixture in said absorption zone, recirculating at least an aliquot of oxidation reaction mixture from said absorption zone to said thiol oxidation zone and recovering sulfonic acid produced by the oxidation of said thiol.

19. The process of claim 18 wherein the oxidation reaction temperature is between about 20° C. and about 60° C.

References Cited in the file of this patent

UNITED STATES PATENTS

| Number | Name | Date |
|---|---|---|
| 1,925,191 | Keller | Sept. 5, 1933 |
| 2,204,210 | Farlow | June 11, 1940 |
| 2,433,396 | Proell | Dec. 30, 1947 |
| 2,489,318 | Proell | Nov. 29, 1949 |
| 2,502,618 | Proell | Apr. 4, 1950 |
| 2,505,910 | Proell et al. | Aug. 2, 1950 |
| 2,567,399 | Proell | Sept. 11, 1951 |